UNITED STATES PATENT OFFICE.

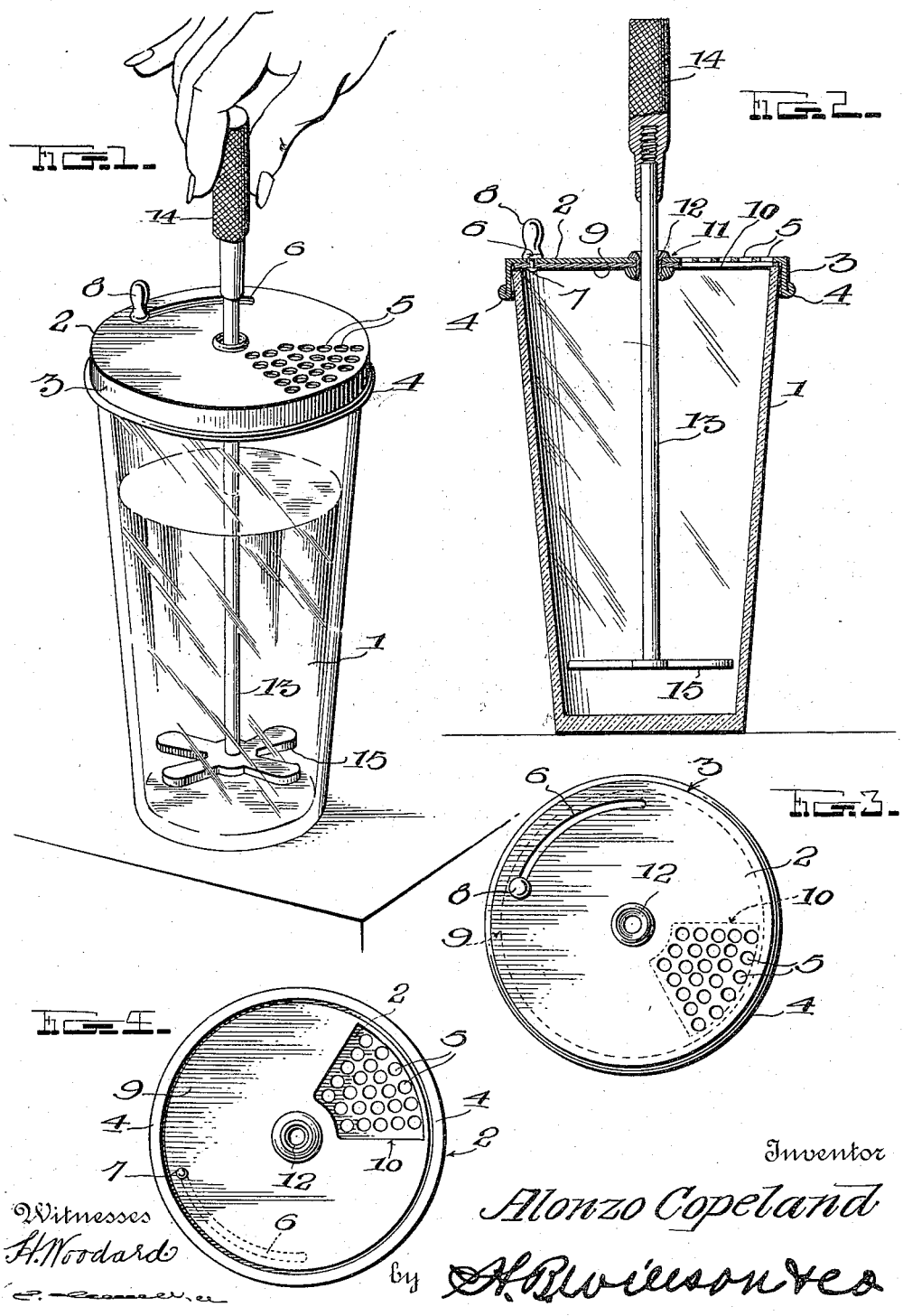

ALONZO COPELAND, OF PHILADELPHIA, PENNSYLVANIA.

DRINK-MIXER.

1,174,828.               Specification of Letters Patent.         Patented Mar. 7, 1916.

Application filed June 10, 1915. Serial No. 33,341.

*To all whom it may concern:*

Be it known that I, ALONZO COPELAND, a citizen of the United States, residing at Philadelphia, in the county of Philadelphia and State of Pennsylvania, have invented certain new and useful Improvements in Drink-Mixers; and I do declare the following to be a full, clear, and exact description of the invention, such as will enable others skilled in the art to which it appertains to make and use the same.

This invention relates to drink mixers.

The object of the invention is to provide a device of this character which while absolutely sanitary is so simple in construction that it can be operated by a child.

Another object is to provide a device of this character the lid or cover of which is provided wtih a simple and efficient strainer equipped with means for opening and closing it as may be desired.

With these and other objects in view, the invention consists of certain novel features of construction, and the combination and arrangement of parts as will be hereinafter more fully described and claimed.

In the accompanying drawings: Figure 1 represents a perspective view of a mixer constructed in accordance with this invention with the strainer shown open; Fig. 2 is a longitudinal vertical section thereof; Fig. 3 is a top plan view of the cover; and, Fig. 4 is a bottom plan view.

In the embodiment illustrated, a glass mixing receptacle 1 is shown which is larger at the top that at its bottom, the bottom being flat on its inner face and of a size corresponding substantially to a dasher 15 to be employed and which will be hereinafter described. A lid or cover 2 is provided for the receptacle 1 and is preferably constructed of nickel-plated metal having an annular flange 3 designed to closely fit the mouth of the receptacle 1 and which is here shown provided on its edge with a rolled rib 4 which is designed to add weight to the cover and assist in retaining it in operative position on the receptacle. This cover or lid 2 is provided with a plurality of perforations 5 here shown arranged in the form of a segment and which are designed to be used as a strainer for the drink mixed in the receptacle and through which said drink is adapted to be poured after it has been mixed. An arcuate slot 6 is formed in said lid concentric with the flange 3 thereof and disposed substantially opposite the perforations 5 forming the strainer and through which a stud 7 is designed to operate, said stud being provided on its outer end with a handle 8 and connected at its inner end to a disk 9 which fits within the flange of the cover proper and is provided with a segmental opening 10 which is adapted to register with the segmental series of perforations when the disk is turned so that the stud 7 carried thereby is at one extreme end of the slot 6 thereby opening the strainer ready for use.

When the stud is moved to the other end of the slot the disk 9 underlaps and covers the perforations 5 and thus completely closes the top. The lid 2 is also made in the form of a metal disk and corresponds in shape and size to the mutilated disk 9 both of which are provided with registering centrally disposed apertures 11 which are united by a sleeve or collar 12 having its ends bent inward into engagement with said lid and disk respectively and which while connecting the two disks and permitting the inner one to revolve relatively to the outer also forms a bearing for the dasher stem 13 which is designed to pass through said bearing and to be reciprocated therein. This stem 13 is provided on its outer end with a detachable handle 14 and at its inner end with the dasher 15 which may be of any suitable or desired construction being here shown substantially in the form of a maltese cross which may be either made integral with the stem or detachable therefrom as may be desired.

The handle 14 is herein shown provided with an internally threaded socket designed to be engaged with the outer threaded end of the stem 13 to provide for its removal to permit the insertion and removal of the stem through the bearing in the top. This handle 14 is preferably milled to present a roughened surface to facilitate its removal and insertion affording a better grip for this purpose.

The dasher 15 is preferably of substantially the same diameter as the lower end or bottom of the receptacle 1 so that when in operative position it will completely fill said bottom and on the rotation thereof will thoroughly mix the contents of the receptacle, the receptacle gradually enlarging toward its top, affording ample space to enable it to receive and contain a considerable quantity of liquid or other material to be mixed.

By making the dasher stem in two parts, the mixer may be used without it when desired.

In the use of this invention when the parts are in the position shown in Fig. 1 the strainer is first closed by the inner disk 9, the ingredients to be mixed having been placed in the receptacle 1, then all that is necessary is to raise and lower the dasher and if desired to rotate it at the same time whereby the contents of the receptacle will be thoroughly commingled.

I claim as my invention:

The combination with a vessel, of a top having a peripheral flange snugly fitting said vessel, said top having an arcuate slot formed therein concentric with its periphery and a segment-shaped series of perforations forming a strainer, a rotary plate mounted on the lower face of said top, a stud on said plate extending through said slot, said plate and top having registering central apertures, a sleeve arranged in said apertures and having its opposite ends bent inward into engagement with said plate and top respectively, connecting them and forming a central bearing, said plate having a segmental opening positioned to register with the segmental series of perforations in said top when said stud carried by said plate is at one extremity of said slot and to be out of register therewith when said stud is at the other extremity of said slot, and a dasher having a stem mounted to reciprocate in said sleeve.

In testimony whereof I have hereunto set my hand in presence of two subscribing witnesses.

ALONZO COPELAND.

Witnesses:
MORRIS LESHNER,
JOHN N. TEESDALE.

Copies of this patent may be obtained for five cents each, by addressing the "Commissioner of Patents, Washington, D. C."